INVENTORS
BURKE A. TRACEY &
JOHN H. ROYSTON

INVENTORS
BURKE A. TRACEY &
JOHN H. ROYSTON

BY

ATTORNEYS

United States Patent Office 3,438,048
Patented Apr. 8, 1969

3,438,048
DECELERATION RECORDER AND/OR SIGNALER
Burke A. Tracey, Wheaton, Ill., and John H. Royston, 107 Hillcrest Road, Pittsburgh, Pa. 15238; said Tracey assignor to said Royston
Original application Aug. 11, 1965, Ser. No. 478,896, now Patent No. 3,341,851, dated Sept. 12, 1967. Divided and this application Mar. 29, 1967, Ser. No. 655,252
Int. Cl. G01d 9/14
U.S. Cl. 346—7                    7 Claims

ABSTRACT OF THE DISCLOSURE

A recording decelerometer is provided including in combination a slideway parallel to the pathway of decelerating movement, an inertial member slidable from a central neutral position on said slideway in either direction and a recording member actuated by movement of said inertial member.

---

This application is a division of application Ser. No. 478,896, filed Aug. 11, 1965, now Patent No. 3,341,851. The present invention relates to decelerometers and more particularly to the impact recording and/or signaling variety.

Our invention finds particular application on railway rolling stocks such as box cars for the indication and recording of impacts imparted thereto regardless of the direction of movement of the rolling stock along the railway tracks.

In one arrangement of our impact decelerometer, means are provided for a visual or other alarm to be energized when adjustably predetermined liimts of impact are exceeded.

Our invention then relates to apparatus for recording inertial forces of moving vehicles or the like, and more particularly to apparatus for recording the energy of horizontally directed impacts which occur when a vehicle such as a railway or box car, encounters an obstacle. In such cases, if damage to the vehicle or to its load occurs, it is desirable to ascertain who is responsible for the damage, i.e., whether or not the operator, for instance a shunt master, an engine driver, or a brakeman allowed the vehicle to run too fast.

Our invention relates particularly to the recording and to the signalling of the residual energy, i.e., that amount of the impact energy which is not consumed by resilient means, such as buffers, on the vehicle or railway car, and, therefore, which may damage the vehicle and/or its cargo. For a given speed at which the vehicle encounters an obstacle, this residual energy is a function of a relative velocity at which the obstacle is encountered. For instance, a railway car may encounter a stop such as a bumping post, or another vehicle which stands still or moves in the opposite direction to that of the encountering vehicle, or both vehicles may move in the same direction. In view of these various conditions, the speed of the vehicle itself is not always the determining factor for the residual energy. Nor is it possible to measure the residual energy by the compression of the buffer springs or other resilient means, firstly; because such springs are so designed as to be fully compressed in the normal operating condition, and secondly because the push from which the damage results need not necessarily strike the buffers springs or the like.

An apparatus of the kind described will register only that residual energy of pushes or shocks which remains after portions of it has been consumed by the buffers, the underframe, the walls of the car body and the like.

By combining the recorder means with clockwork as described, it is possible to ascertain the time at which the damage has occurred, and particularly in railway operation, it can be ascertained for example whether the damage occurred during shunting and whether the shunting men are guilty of carelessness.

When shunting, stop blocks are placed on the rails at a suitable distance from obstructions in order to prevent heavy pushes and collisions when making up trains. If the shunting men are careless in this respect, my recording and signalling decelerometer shows this and, therefore, has an educational and deterrent influence in railway operation and particularly in shunting.

A system of units may be established as standards for the residual energy. The standard units are preferably determined by recording the residual energy when the vehicle encounters a fixed obstacle such as a bumping post at various speeds. The residual energy recorder under this condition is the standard for measuring the residual energy under other conditions. For instance, the standard units of residual energy may be designated conveniently by numerals indicating the speed in m.p.h. at which the vehicle encountered the bumping post or the like.

If, for instance, it has been found experimentally in the manner described, that an impact having the residual energy corresponding to the speed of 4½ miles per hour will damage a given load and if in the case of such load damage, a residual energy corresponding to 4½ m.p.h. or more is recorded and/or signalled, it is clear that the damage which has been done is due to the residual energy, while if the residual energy is less than that corresponding to 4½ m.p.h., it is equally clear that the damage must be due to other causes.

Our recording and/or signalling decelerometer consequently eliminates to a certain degree uncertainty in guessing about the cause of the damage to cargo and provides conclusive records instead. Our device will not only record the rough handling of railway cars in transit but is of value to the railroad in determining where cars are handled roughly and also in the settlement of claims for broken freight and interroad movement. The fixing of responsibility and settlement of claims in regard thereto, in facilitated by another feature of our invention which provides an alarm such as a visual signal which is actuated for an adjustably varying period after the excessive impact or deceleration which induces the alarm.

For convenience in the use of our recording decelerometer we have established a calibration of impact zones damaging and not damaging residual energies, which are in turn related to the standard m.p.h. impact speeds universally employed by the railroads. Those impact zones are tabulated hereinafter.

It has been estimated that railway freight damage claims amount presently to about half a billion dollars per year, including processing costs. However, this is only a fraction of the actual cost. Among those other costs attributable to rough handling are damage to railroad equipment, such as torn-out linings, bowed doors, bulged ends, and the cost of cleaning railway cars contaminated with spoiled food stuffs, paint, tar, resins, and so forth. Of course, the greatest portion of all such cost cannot be assessed at all. That is, the cost of loss business resulting from customer dissatisfaction.

For many years, railroads have employed impact recorders whose only function is to furnish an historical record of impact experience of a particular car on a particular trip. If enough trips were made, and the amount of excessive speed impact occurred, it could be established over a period of time that some particular area appeared to be an area where cars were being roughly handled, and studies could then be made and responsibility assigned to correct these conditions.

However, in order to reduce damage significantly, the decelerometer must be capable of more than merely recording the amount and times of impact. The decelerometer must also act as a deterrent to rough handling which would produce damage. The decelerometer should be capable of signalling immediate knowledge that an excessive speed and impact has occurred, with the result that responsibility immediately can be established and corrective or disciplinary action taken. It should provide an accurate and easily read record of impact, which record can be readily reproduced as required. The decelerometer must perforce be of rugged construction to withstand rough handling. On the other hand, it must be constructed as light as possible to facilitate handling and installation. It must be compact and dimensioned so as not to exceed the allowable dimensions of projection from the side of the railway car.

Most importantly, the decelerometer of our invention is designed for securance to the outside of the railway car where it is at all times visible. For example, two such decelerometers can be secured to the sides respectively, one decelerometer can be mounted on the top or end of the car where it can be seen from either side of the car. It has previously been the established practice to attempt to hide impact recorders in the railway cars so equipped. Experience, however, has shown that when some railway men knew of its presence and placed an identifying mark or sign on the side of the car, the latter was less inclined to experience heavy impact than when such car was moved without the presence of an impact recorder being known. This follows from the fact that other railway men handling the car en route who saw and correctly interpreted the sign were governed accordingly. Special consideration was accorded the car so equipped in the knowledge that the recorder was there.

It follows then that every railway car containing highly damage prone or exceptionally valuable cargo can be protected by an openly advertised, clearly visible decelerometer, which in addition to the recording feature, is arranged to call attention to its presence, particularly when allowable impacts are exceeded, as by a flashing light signal or other alarm indicia. In fact, it is probable that many of the cars, with less fragile cargoes, could be "protected" with empty, but otherwise identical decelerometer cases.

The warning signal, which is preferably a blinking lamp, is arranged to be energized automatically when our decelerometer establishes that an adjustably preset impact limit has been exceeded. This is facilitated by the use in the signal circuit of a limit indicator cooperative with a scale which can be calibrated in any convenient units, for example in miles per hour in excess of a safe impact lower limit, such as four and one-half miles per hour. Thus, if an impact does occur at sufficient velocity to have possibly caused damage to the cargo, this fact is rendered immediately obvious by energization of the warning lamp. The lamp will continue to be energized for an adjustable time interval following the impact. For example, the lamp energizing circuit can be set to energize the lamp for a period of up to four hours follows the excessive deceleration or impact. This acts not only as a deterrent to operating personnel, but calls immediate attention to the fact that such impact has occurred and permits immediate establishment of responsibility and disciplinary actions, if desired or required.

The record produced by our deceleration recording apparatus is compact and inexpensive and can be readily read and reproduced. Moreover, a continuous time-based recording is furnished, extending over a period for example, of more than two weeks or the length of time in which it is anticipated that a given cargo will remain in the railway car. Previously, a recording drum was utilized with a scroll-type chart of about 25 feet long. This was not only difficult to read but very expensive to reproduce.

Our deceleration recorder and signaler, moreover, can be readily installed upon simple brackets therefore, which preferably will be provided on all railway cars which will carry cargoes subject to impact damage. Thus, the recorders can be readily installed and removed when such cargo is loaded and unloaded relative to a given railway car.

These and other objects, features, and advantages of the invention, together with constructional details thereof, will be elaborated upon during the following description of certain presently preferred embodiments of the invention.

In the accompanying drawings, we have shown certain presently preferred embodiments of the invention in which.

Figures 1, 2:
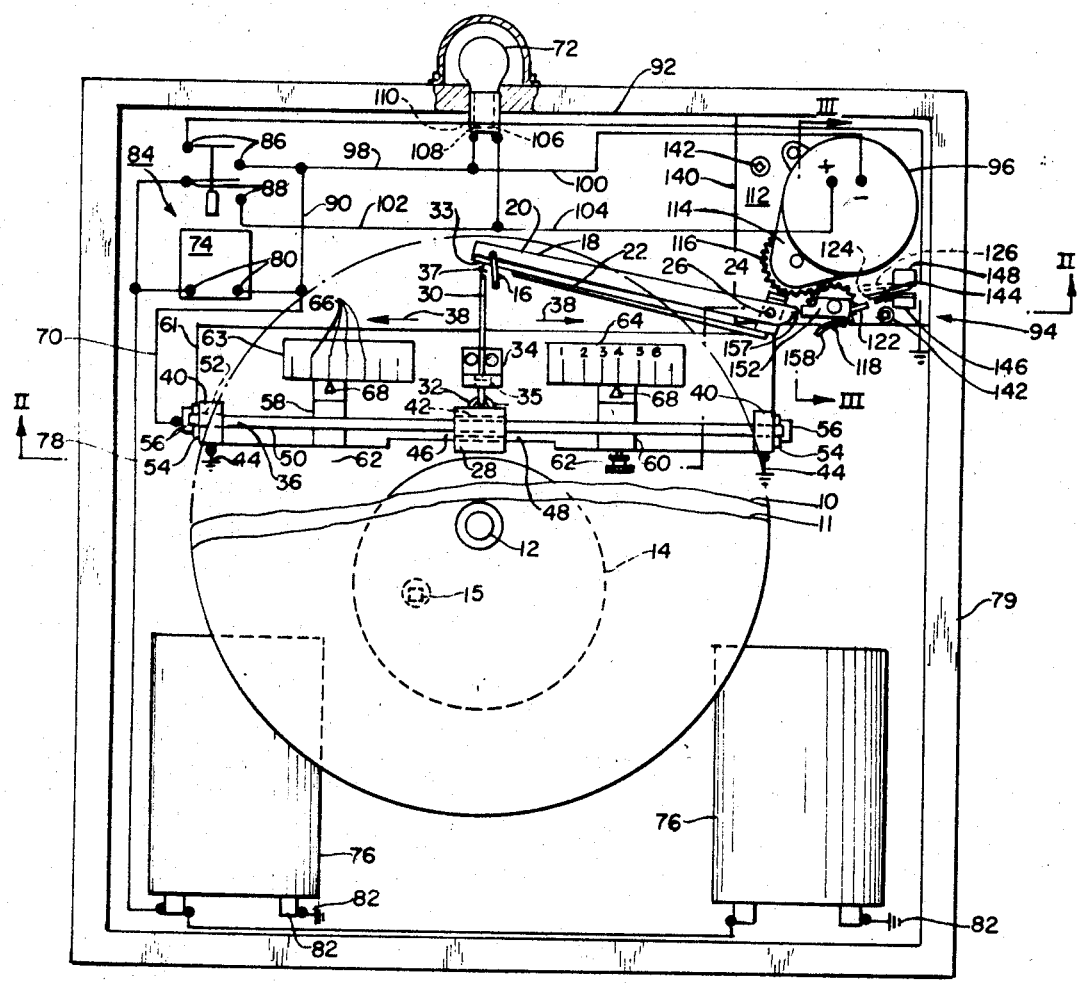
FIGURE 1 is a top plan view of one form of our impact recording and signalling apparatus including electrical circuiting related to the component parts thereof.
FIGURE 2 is an elevational view, partly is section, of the impact recorder and signaler shown in FIGURE 1 and taken along reference line II—II thereof.

Referring now to FIGURES 1 and 2 of the drawings, of the illustrative form of the invention shown therein includes an impact record disc or circular chart 10 secured for rotation to a stub shaft 12 forming part of clock mechanism 14. The underside of the record disc 10, in this example, is divided into 360°, with each degree being equivalent to one hour (not shown), so that the time record 10 makes one complete revolution every two weeks. The clock movement 14 is a very accurate movement which revolves its output shaft 12 through one complete revolution every 15 days. The clock mechanism 14 can be provided with a spring actuated movement, the spring of which can be wound by the keyed winding shaft 15.

As better shown in FIGURE 2 of the drawings, the time record disc 10 overlies a recording stylus 16 affixed adjacent the free end 18 of a pivoted recording arm 20. When thus engaged by the stylus 16, the chart is supported by an overlying, discoidal supporting plate 11. Suitable biasing means such as the cantilevered leaf spring arrangement denoted generally by reference character 22 also are secured to the pivot post 24 on which the recording arm 20 is pivoted as denoted by reference character 26. In this arrangement of my apparatus, the cantilevered leaf spring arrangement 22 is fabricated such that movements of the recording arm 20 against the biasing action of the leaf spring arrangement 22 moves the recording stylus 16 across suitably calibrated units (not shown) on the underside of the time record 10.

Impacting or decelerating forces are transmitted to the recording arm 20 by means of an inertial member 28, which in this example is tied to the free end 18 of the recording arm 20 by means of a wire or nylon string or cord 30. The cord is tied to eye-brackets 32 and 33 secured respectively to the inertial member 28 and the recording arm 20, and passes through an apertured guide bracket 34, secured for example to the bottom wall of a carrying case (not shown) or other supporting means for my decelerometer apparatus. The edges of the aperture 35 in bracket 34 are rounded in order to minimize wear of the wire or string 30. In this example a stranded, and therefore flexible, stainless steel cord is preferred, which cord is connected at its recording arm end to a relatively short coil spring 37 to maintain the cord 30 in a taut condition at the neutral position of the inertial member 28. The spring however is sufficiently strong to overcome the counter bias of the recording arm spring means 22 without exceeding the elastic limit of the cord spring 37. Another primary function of the cord spring 37 will be detailed below. When secured as aforesaid, the eye-brackets 32 and the guide bracket 34 preferably are disposed at a transverse center line passing through the at-rest or neutral position of the inertial member 28.

The inertial member 28 is slidably mounted upon a slideway such as a longitudinal rod 36, which in turn is supported at its ends respectively by a pair of spaced standards 40. The longitudinal rod 36 is thereby supported preferably parallel to the path of vehicle movement as denoted by arrows 38. In this example, the inertial member 28 is provided with metallic antifrictional means such as the sleeve bearing 42 to facilitate movement along the longitudinal rod 36, which is inserted through the bearing 42. The antifrictional means 40 can also be provided in the form of a thrust type ball bearing arrangement. In any event, the bearing 42 provides electrical contact between the inertial member 28 and the longitudinal rod 36, which are also fabricated from electrically conductive material, for purposes hereinafter elaborated upon. Alternatively, a nylon or other plastic sleeve-type bearing can be utilized for the antifrictional means 42 and a slide contact (not shown) can be affixed to the inertial member 28 for comparatively lightweight, sliding engagement with the slide rod 36.

The rod supports 40 are also fabricated from or otherwise provided with electrically conductive material along their lengths and are preferably mounted upon a conductive carrying case or other supporting means denoted at 79 forming a system ground for the electric circuit of our apparatus. The grounding of the supports 40 in thin fashion is denoted by grounding conductors 44. A grounding path is thus formed through the supports 40, the slide rod 36 and the inertial member 28 to the system ground.

A pair of spring contacts 46 and 48 are secured respectively to the ends of the inertial member 28 and as better shown in FIGURE 2, adjacent the lower edges thereof. Also, as better shown in FIGURE 2, the aforesaid pair of contacts can be the ends of a single contact spring secured to the underside of the interial member 28 by a pair of mounting screws. The contacts 46 and 48 thus are in electrical contact with the inertial member 28, for purposes elaborated upon hereinafter.

The supporting uprights 40 also support at an intermediate elevation a second slideway, such as slide rod 50, which, as better shown in FIGURE 2, is supported below and in parallel to the inertial slide rod 36. The second slide rod 50 desirably is fabricated from a good conductive material and is insulated at its ends from the supports 40 by a pair of respective insulating sleeves 52. The second slide rod 50 is retained against longitudinal movement relative to the supports 40 by insulating washers 54 and end collars 56.

A pair of impact limit indicators 58 and 60 are slidably mounted upon the second slide rod 50 for adjustable securance therealong by means of thumb screws 62. Each of the limit indicators 58 and 60 cooperate with a suitably calibrated scale 63 or 64 affixed parallel to the anticipated path of movement of the limit indicators 58 and 60. The scale 63 and 64 can be indexed with suitable units, for example corresponding to standard impacts of selected speed ranges in miles per hour. For convenience the markets designate numerically zones of impacting force as follows:

| Zone | Standard impacting speed (m.p.h.) | Damage |
|---|---|---|
| 1 | 0-3 | None. |
| 2 | 4-5 | Borderline. |
| 3 | 6-7 | |
| 4 | 8-9 | Amount varies with force. |
| 5 | 10-11 | |
| 6 | 12-13 | |

The scale markets 66 are disposed such that when the inertial member contacts 46 and 48 engage the top surfaces respectively of the limit indicators 58 and 60, the latter will denote by their index marks 68 the proper corresponding markets 60.

When contact is thus made between the inertial member contact 46 or 48 and the associated adjustable impact indicator 58 or 60 respectively, an electrical path to ground is established from a ground lead or conductor 70 electrically connected to the projecting end of the second slide rod 50 or to its associated collar 56, through the slide rod 50, the limit indicator 58 or 60, the contact 46 or 48, the inertial member 28 and its slide rod 36, the slide rod supporting standards 40, and the support plate 61 mentioned below.

As better shown in FIGURE 2 on the underside of each of the limit indicators 58 and 60 is secured a bearing plate 59, fabricated from a plastic or other suitable bearing and insulating material. The bearing plates 59 slidably engage impact support plate 61 as the limit indicators are moved along the slide rod 50. Such sliding engagement prevents turning or canting of the limit indicators upon the slide rod 50, but more importantly prevents grounding contact of the indicators with the support plate 61. Desirably, the slide rod supports 40, the wire or spring bracket 34, and the members 63 and 64 are all mounted upon the impact support plate 61, so that these components can be assembled in our arrangement as a unit.

The aforementioned adjustment of the impact indicators 58 and 60, and their electrical contact with the inertial member 28 when the limits thereby set are exceeded establish a circuit path for energizing a warning lamp 72 or other suitable alarm indicia. Of course, a continuous record of all impacts are recorded upon the time record 10 by the recording arm 20, as occasioned by any movement of the inertial member 28. Of course, after any such decelerating movement of the inertial member 28, irrespective of its engagement or lacking of engagement with the limit indicators 58 and 60, the leaf spring arrangement 22 urges the recording arm 20 in the clockwise direction as viewed in FIGURE 1 to exert a pull on the string or wire 30 which returns the inertial member 28 to its neutral position. A continuous record of all such impacts or deceleration is thereby inscribed upon the underside of the recording disc 10.

Assuming now that the vehicle on which our impact recorder and signaler is installed has suffered an impact of sufficient force to electrically engage the inertial member 28 with one of the limit indicators 58 or 60, depending upon the direction of vehicle movement, an electric circuit is established through relay coil 74 and battery or other source of potential 76. This circuit is established by means of conductors 70 and 78 which are connected to relay coil terminals 80 and through the aforementioned grounding path including the slide rods 36 and 50 and their supports 38 and 40, and through the conductive support 79 (FIGURE 2) for the apparatus as denoted by grounding conductors 44 and 82 (FIGURE 1). The relay coil 74 is part of a holding type relay denoted generally by reference character 84 and when energized closes the respective pairs of its contacts 86 and 88. Since the electrical pulse produced by engagement of the inertial member 28 with one of the indications 58 and 60, is of relatively short duration, the relay contacts 86 are utilized as holding contacts to connect the associated one of the coil contacts 80 to an alternate electrical path to ground. This latter path to ground is established by means of conductor 90, relay contacts 86 when closed, conductor 92, and a normally closed grounding or holding switch 94.

At the same time, closure of contacts 86 similarly grounds the negative terminals of the lamp 72 and of timer motor 96 to conductors 98 and 100 respectively. The simultaneous closure of the other pair of relay contacts 88 connects the positive terminals of the lamp 72 and the timer motor 96 to the positive side of battery 76 through conductors 102 and 104, the closed relay contacts 88 and conductor 78. Thus, the brief engagement of the inertial member 28 with either of the limit indicators 58 or 60 provides simultaneous energization of the warning lamp 72 and the timer motor 96. Desirably, a suitable blinker device 106 of known construction is incorporated either in the socket 108 or the base 110 associated with the lamp 72.

After the excessive impact has occurred, in either direction as denoted by arrows 38, the warning lamp 72 will continue to be energized for a period as determined by the timer mechanism 112. In furtherance of this purpose, the timer mechanism 112 operates through a gear reduction unit 114 of known construction to impact a slow rotary motion to output drive pinion 116.

As better shown in FIGURE 2, the pinion 116 is enmeshed with gear 118 forming part of rotatably mounted ground switch actuator denoted generally by reference character 120. Rotation of the gear 118 in turn rotates the actuator 120 and therewith, ground switch actuating projection 122 to the position indicated by dashed outlines 124 (FIGURE 1) where it opens the grounding switch 94, by moving its contact 144 in the clockwise direction to its switch open position as denoted by the dashed outline thereof 126. This operation, however, does not yet interrupt the grounding path represented by conductor 92, relays contacts 86 and conductor 90 because the open grounding switch 94 is now bypassed to ground through the grounding switch actuator 120. For this reason the ground switch actuator 120 including the actuator pin 122 is fabricated from metallic or other good electrically conductive materials, and its mounting upon the mounting plate 140 and system support (ground) 79 preserves electrical contact therewith, as described more fully below. Consequently the timer motor 96, the holding relay 84 and the alarm or lamp 72 continue to be energized and the clock mechanism 112 continues to rotate the switch actuator 120 until its pin 122 passes the outer end of the grounding switch spring contact 144 in its opened position 126. At the instant when the actuator pin 122 leaves the free end of the grounding switch contact 144 and the latter begins to spring back toward its normally switch-closed position against the other grounding switch spring contact 146, then the patch to ground is momentarily interrupted. However, this momentary interruption is sufficient to deenergize the relay coil 74 which releases the normally open contacts 86 and 88 of the holding delay 84. Thus, at the end of the alarm interval, the warning lamp 72 and the timer motor 96 are also deenergized, and the alarm circuit is now in standby condition preparatory for actuation by a succeeding engagement of the inertial member contact means with one of the associated limit indicators 58 or 60. As described more fully below, the alarm circuit can also be deenergized in the foregoing manner by manually rotating the switch actuator 120 until its pin 122 clears the grounding switch contact 144.

In this arrangement of the invention, with the switch actuator pin 122 initially in the aforementioned standby position about two and one-half hours is consumed by the timing mechanism 112 and the switch actuator 120 in making one revolution of the latter. Obviously, a longer or shorter maximum time interval can be provided by a routine designer.

In accordance with our invention, however, means are provided as aforesaid for manually rotating the switch actuator 120 to deenergize the alarm circuit before the anticipated termination of the maximum time interval provided by the normal operation of the alarm circuit. Additional means are provided, in accord with another feature of our invention, in association with the switch actuator 120 and the recording arm 20 to indicate the fact of such manual deenergization and the exact time of such occurrence. As the time of impact and possible resulting damage to the vehicle and/or cargo has already been recorded, this constitutes an additional and cooperating evidentary factor in establishing responsibility for the damage.

One arrangement for manually rotating the switch actuator 120, as shown more fully in FIGURE 2 of the drawings, includes spring loading the gear 118, which is otherwise rotatably mounted at the lower end of the actuator pin shaft 128. A peripheral flange 130 is formed at the upper end of the shaft 128 to serve as a spring stop and also as a support for the actuator pin 122. Adjacent the lower end of the shaft 128, the rotatably mounted gear member 118 has formed integrally thereon a cooperating peripheral flange 132, which serves as the other spring stop. The lower end of the actuator shaft 128 is staked or otherwise deformed as denoted by reference character 134 to retain the gear member 118 thereon. A compressed coil spring 136, retained between the spring stops 130 and 132 and upon the shaft 128, produces a bearing and a frictionally increased engagement between the gear member 118 and the deformed shaft portion 134. With this arrangement, the spring shaft 128 and actuator pin 132 can be rotated manually relative to the gear member 118, with the latter being held stationary by its enmeshment with the timer pinion 116. When the alarm circuit has been actuated as described above the switch actuator 120 with its pin 122 can be manually rotated past the grounding switch contact 144 to the standby position of the actuator. The compressed coil spring 136, however, induces sufficient frictional engagement between the actuator shaft 128 and the gearing member 118 so that the actuator pin 122 and actuator shaft 128 rotates with the gearing member 118 during the normal timer interval to actuate the grounding switch 94 without relative angular movement between the actuator pin 122 and the shaft 128 on the one hand and the gearing member 118 on the other.

One arrangement for manually rotating the grounding switch actuator 120 includes rotatably mounting the actuator shaft 128 and associated components upon an upright stub shaft 138 inserted through the actuator shaft 128, which is made tubuliform for this purpose. The stub shaft 138 is rotatably mounted upon an auxiliary support plate 140 which is in turn secured by mounting bolts 142 or the like to the aforementioned system support or carrying case 79. The support plate 140 thus is secured in good electrical contact with the aforementioned support or case, to provide the aforementioned bypassing grounding path through the switch actuator 120 and to ground one of the grounding switch contacts, e.g., the spring contact 146, as noted below. For convenience, the timer mechanism 112, the grounding switch contacts 144 and 146 and their supporting standard 148, and the recording arm supporting standard 24 are all mounted upon the auxiliary supporting plate 140 so that these components of our arrangement can, if desired, be assembled therewith as a unit. As better shown in FIGURE 2, the ground contact 146 can be grounded by means of a conductive strip 147, electrically connected to the plate 140 by one of the securance screws 149 of the grounding switch support 148.

The rotatable mounting of the stub shaft 138 on the auxiliary support is snugly fitted so that some resistance to rotation of the stub shaft 138 is encountered due to resultant friction. One arrangement for so mounting the stub shaft 138 on the auxiliary support 140 includes forming a disc 150 concentrically at the lower end of the stub shaft 138, which disc is fitted in a countersunk recess in the underside of the conductive support 140. Preferably, when so fitted, the bottom surface of the disc 150 projects slightly below the undersurface of the auxiliary supporting plate 140, so that when the latter is mounted as noted above, a clamping force can be adjustably applied to the disc 150 to produce the desired amount of resistance to rotation of the stub shaft 138 to prevent accidental rotation thereof. A screwdriver or other tool actuating projection 151 is secured to the disc 150 and projects through an opening therefor, in the support or carrying case 79. The projection 151 is provided with a screwdriver slot 153 or the like for rotating the stub shaft 138 and a stop member 152 secured, as by means of set screw 154, to the upper end of the stub shaft 138 for rotation therewith. When so positioned, the stop member 152 is closely adjacent the spring stop flange 130 of the actuator shaft 128 to retain and to position the latter upon the stub shaft 138.

As better shown in FIGURE 2, the stop member 152 is provided with a depending actuator pin stop 156 which extends downwardly a sufficient distance to engage the actuator pin 122 when the stop memer 152 and stub shaft 138 are rotated. The actuator pin stop 156 thus engages the actuator pin 122 to rotate the actuator shaft and pin 128, 122 past the grounding switch contact 144 to de-energize the alarm circuit, including the warning lamp 72 and the timer motor 96. Owing to the aforesaid frictional engagement between the actuator shaft 128 and the gear member 118 the actuator shaft 128 can be angularly displaced relative to the gear member 118 when thus moved by manual rotation of the stop member and pin stop 152, 156.

With this arrangement, the alarm circuit can be de-energized without the use of special tools and without opening a carrying case, such as denoted at 79, which can be provided with our apparatus. When used, for example, in railway applications it is contemplated that the apparatus will be mounted in a case the lid of which will be bracketed upon the outside of the railway car. The case will be locked by suitable known locks and the key or keys will not be available to the railwaymen responsible for the actual shunting, humping, or other physical movement of the vehicle. Thus, the alarm circuit can only be deenergized by rotating the stub shaft 138, if it is to be deenergized at all before expiration of the normal time interval provided by the alarm circuit clock mechanism 112. However, means are provided as aforesaid to record the exact time at which the alarm circuit is prematurely or manually deenergized.

One form of such recording means includes a leaf spring 158 secured adjacent the other end of the stop member 152 and extended toward its pin stop end. As better shown in FIG. 1 of the drawings, when the stop member 152 is rotated counterclockwise to its illustrated position, the leaf spring 158 engages a rearwardly extending projection 157 formed on the recording arm 20 to impart a relatively small but readily recordable clockwise movement to the recording arm. The latter movement is opposite in direction to the deceleration-induced recording movements of the arm 20 and thereby produces a very noticeable "negative" peak extending outwardly of the base line on the chart 20, whereas all of the deceleration record extends inwardly. When the recording arm projection 157 is so engaged by the stop member spring 158, the latter spring and recording arm spring means 22 overcome the force exerted by the cord tensioning spring 37 to induce the aforedescribed recording arm movement. Alternatively, or in conjunction therewith, either or both ends of the stop member 152 can be elongated to engage the recording arm projection 160 and to clear the same after resultant, outwardly pivotal movement of the recording arm 20 to ensure more positively the tell-tale movement of the recording arm with each rotation of the stop member and stub shaft 152, 138 to deenergize the alarm circuit.

In furtherance of this purpose of the invention, it is essential that the recording arm 20 be moved in the opposite direction relative to deceleration induced movement thereof. Accordingly, means are provided by our invention for ensuring that the stop member 152 and stub shaft will be rotated only in that direction which will induce such opposite movement of the recording arm. In the arrangement of our apparatus as shown in FIGURE 1 the stop member must be so moved in the counterclockwise direction, and means are provided by our invention to render the stop member and pin stop 152, 156 capable of rotating the grounding switch actuator, only when moved in the proper rotative direction.

Figure 3:
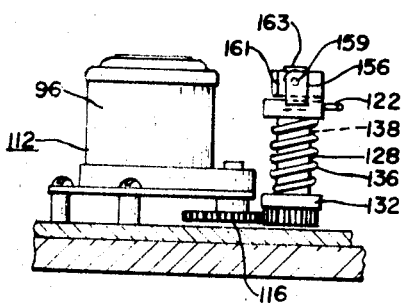
FIGURE 3 is a partial elevational view, partly in section, of the apparatus shown in FIGURE 1 and taken along reference line III—III thereof.

As better shown in FIGURE 3, one arrangement for assuring proper rotation of the stop member 152 includes pivotally mounting the depending pin stop 156 as indicated by the reference character 159. When the pin stop 156 properly engages the actuator pin 122, as when the stop member 152 is moved counterclockwise, the pin stop 156 is backed up by a ridge 161 formed on the associated end of the stop member to prevent pivoting of the pin stop 156. However, when the pin stop 156 approaches the actuator pin 122 from the improper or clockwise direction a rounded corner 163 adjacent the pivot 159 permits the pin stop 156 to pivot freely relative to the ridge 161, and the stop member cannot move the switch actuator, so that the normal alarm interval is not disturbed. Of course, as seen from FIGURE 1 the grounding switch contacts are arranged so that they can be separated only when the actuator 120 is moved counterclockwise, in any event.

Figure 4:
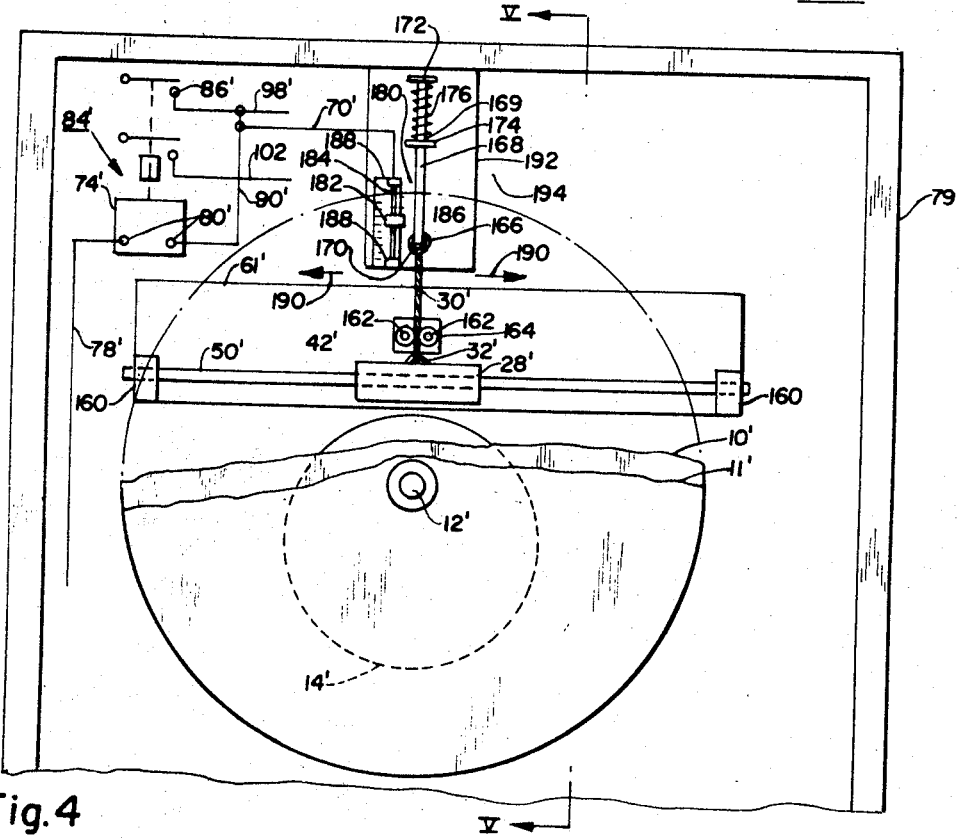
FIGURE 4 is a partial top plan view of another arrangement of our impact recording and signaler arrangement.
Figure 5:
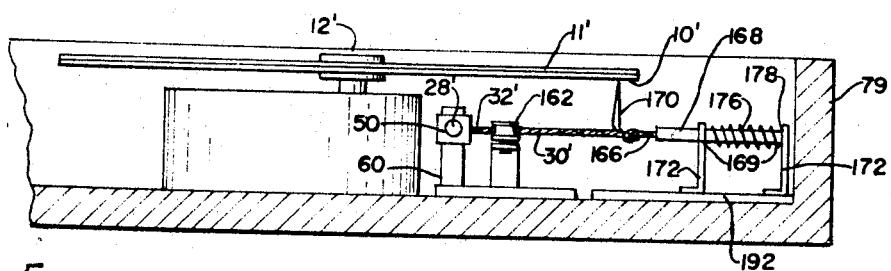
FIGURE 5 is an elevational view, partly in section, of the apparatus shown in FIGURE 3 and taken along reference line V—V thereof.

Referring now to FIGURES 4 and 5 of the drawings, similar reference characters with primed accents refer to similarly identified components of FIGURES 1–3. In the modification of our impact recorder and signaler, as arranged in FIGURES 4 and 5, the member 28' is similarly arranged for sliding the movement along the slide rod 50'. The inertial member contacts 46 and 48 (FIGURES 1 and 2) are, however, omitted in this arrangement of our invention, since no grounding path is established through the inertial member 28' and associated components. For the same reason, the inertial member bearing 42' can be fabricated from a plastic or other electrical insulative material without providing auxiliary contact means between the inertial member 28' and the slide rod 50'. The ends of the slide rod 50' are secured to a pair of supports 160 respectively which in turn are mounted in upstanding fashion upon the impact support plate 61'. In this arrangement of my apparatus, however, the remaining components of my apparatus, which are illustrated in FIGURES 1 and 2 as being supported or mounted upon the plate 61' are omitted therefrom.

The restraining cord 30' for the inertial member 28' passes between a pair of pulleys 162 therefor, which are mounted respectively upon a pair of upstanding stub shafts 164, which in turn are secured to the supporting plate 61', as better shown in FIGURE 5 of the drawings. The other end of the restraining cord 30' is tide to an eyebracket 166 secured to the recording end of a recording plunger 168. A stylus 170 is secured to the same end of the recording plunger 168 and is positioned to engage the underside of the circular chart 10'. As better shown in FIGURE 5, the chart 10' is backed up by a relatively rigid disc 11'. The chart and disc 10', 11' overlie the recording stylus 170 throughout its path of travel from a chart base line (not shown) adjacent its outer periphery.

The recording plunger 168 is mounted for rectilinear movement through suitable apertures 172 therefor in a supporting bracket 174. A loading impact spring 176 surrounds that portion of the recording plunger 168 within the bracket 174. The spring 176 is retained between a spring stop 178 secured to the recording plunger 168 and the opposed portion 169 bracket structure.

A spring contact 180 is mounted upon the recording plunger 168 in electrical contact therewith and adjacent preferably the forward end thereof. As the recording plunger 168 is moved downwardly, as viewed in FIGURE 3, under impetus of the inertial member 28', the spring contact 180 engages a impact limit indicator 182 which is adjustably and slidably mounted upon slide rod 184 therefore. The impact indicator 182 cooperates with a scale member 186, which can be constructed and calibrated similarly to that described above in connection with the scale members 62 and 64. The slide rod 184 is insulatingly supported upon a pair of supporting uprights 188 in the manner described in connection with the insulated slide rod 50 of FIGURE 1. The length of the recording plunger 168 and of the conductive slide rod 184 and the strength of the impact spring 176 together with the length of the impact slide rod 50' are selected to accommodate the anticipated longitudinal movements of the inertial member 28' in either direction as denoted by arrows 190.

When impact forces exceed allowable limits as established by the positioning of the limit indicator 182, the spring contact 180 upon movement of the recording plunger 168 engages and electrically contacts the adjacent side surface of the limit indicator 182. The spring contact 180, the recording plunger 168, its supporting bracket 174 together with mounting plate 192 are fabricated from electrically conductive material so that a conductive path to ground is provided therethrough as denoted illustratively by a ground conductor 194. The mounting plate 192 desirably is secured in electrically conductive relationship to a suitable support or carrying case, such as the case 79' (FIGURES 1–3), for the arrangement of FIGURES 4 and 5 which being conductive forms a system ground for the apparatus. The scale 186 and the supports 188 for the slide rod 184 are also mounted upon the mounting plate 192, as better shown in FIGURE 4, in order to preserve the calibrated relationship between the scale member 186 and the decelerating spring 176. The impact indicator 182 and the slide rod 184 also are fabricated from conductive material, but are insulated from the supports 188 and from the scale member 186, for example, in the manner described previously in connection with the conductive slide rod 50 and slide rod supports 38 and 40 of FIGURES 1 and 2.

When thus insulated, one end of the slide rod 184 is connected to the conductor 70' so that a circuit is momentarily established between the battery or potential source 76 (FIGURE 1) and the coil 74' of the relay 84' (FIGURE 1) through conductor 78' and 70', the slide rod 184, the limit indicator 182, contact spring 180, recording plunger 168 and its bracket 174, mounting plate 192 and the system ground 194.

The electrical pulse thus produced is of relatively short duration as in the case of the arrangement of FIGURES 1–3 so that the relay 84' "locks in" as described previously in connection with FIGURES 1–3. The arrangement of FIGURES 4 and 5 can be utilized with the same circuit components illustrated and described in connection with FIGURES 1–3.

From the foregoing it will be apparent that novel and efficient forms of a recording and signaling decelerometer have been disclosed herein. While we have shown and described certain presently preferred embodiments of the invention, it is to be distinctly understood that the invention is not limited thereto but may be otherwise variously embodied within the scope of the following claims. For example, it will be readily apparent that the decelerometer can be employed without the recording feature or without the alarm circuit and that the latter is useful and novel per se. Moreover, the recording member of FIGURES 1 to 3 can be used in the arrangement of FIGURES 4 and 5 and vice versa. Similarly, the impact limit indicator means of FIGURES 4 and 5 can be employed in the arrangement of FIGURES 1–3 and vice versa.

We claim:

1. In a recording decelerometer, the combination comprising a slideway mounted generally parallel to the path of decelerating movement, an inertial member slidably mounted on said slideway for movement in opposite directions parallel to the path of decelerating movement from a central neutral position on said slideway, a recording member, means for mounting said recording member at a position adjacent said slideway for recording movement perpendicular relative to said slideway, a flexible cord connected at its ends to said inertial member and to said recording member, means supporting said cord for flexing movement thereof adjacent a neutral position of said inertial member so that movement of said inertial member in either direction along said slideway induces corresponding movements of the adjacent portions of said recording member, and means for biasing said recording member portion to a base position thereof corresponding to said neutral position of the inertial member so that said inertial member is returned to its neutral position following deceleration induced movement thereof.

2. The combination according to claim 1 characterized in that said cord support is an apertured bracket mounted adjacent the neutral position of said inertial member, the edges of said bracket aperture being rounded to reduce wear of said cord.

3. The combination according to claim 1 characterized in that said cord support is a pair of closely spaced pulleys rotatably mounted adjacent the neutral position of said inertial member and disposed generally in the plane of the flexing movement of said cord induced by movement of said inertial member.

4. In a recording decelerometer, the combination comprising a slideway mounted generally parallel to the path of decelerating movement, an inertial member slidably mounted on said slideway for movement in opposite directions parallel to the path of decelerating movement from a central neutral position on said slideway, a recording member in the form of a plunger having a recording stylus thereon, means for mounting said recording member at a position adjacent said slideway for rectilinear movement transversely of said slideway and radial recording movement relative to a chart, a flexible cord connected at its ends to said inertial member and to said recording member, means supporting said cord for flexing movement thereof adjacent a neutral position of said inertial member so that movement of said inertial member in either direction along said slideway induces corresponding movements of the adjacent portions of said recording member, and means for biasing said recording member portion to a base position thereof corresponding to said neutral position of the inertial member so that said inertial member is returned to its neutral position following deceleration induced movement thereof.

5. The combination according to claim 4 characterized further in that said biasing means is a coil spring surrounding said plunger and compressible between a spring stop on said plunger and a juxtaposed portion of said plunger support.

6. In a recording and signalling decelerometer, the combination comprising a first slideway mounted generally parallel to the path of decelerating movement, an inertial member slidably mounted on said first slideway for movement in two opposite directions parallel to the path of decelerating movement from a central neutral position on said slideway, a recording member, means for mounting said recording member at a position adjacent said first slideway for recording movement perpendicular relative to said slideway, a flexible cord connected at its ends to said inertial member and to said recording member, means supporting said cord for flexing movement thereof adjacent a neutral position of said inertial member so that movement of said inertial member in either direction along said first slideway induces corresponding substantially transverse movements of the adjacent portion of said recording member, means indicator slidably mounted on said second slideway, means for securing said limit indicator at selected positions along the length of said second slideway, contact means on said recording member disposed to engage said limit indicator when said recording member and contact means are moved by said inertial member to a position juxtaposed to the selected position of said limit indicator, an alarm circuit, a source of electric potential connected to said alarm circuit and to said recording member, and said alarm circuit being connected to said second slideway so that potential is applied to said alarm circuit when said recording member contact means engages said limit indicator.

7. In a recording decelerometer, the combination comprising a decelerational pathway, an inertial member mounted for movement along said decelerational pathway in opposite directions from a central neutral position, a recording pathway disposed adjacent to and transversely of said decelerational pathway, a recording member mounted for movement along said recording pathway in perpendicular inscribing relationship with a record chart, flexible connecting means coupling said recording member and said inertial member together in comovable relation, and means for biasing said recording member to a chart base-line position in said recording path whereby said inertial member is correspondingly biased to said central neutral position in said decelerational pathway.

References Cited

UNITED STATES PATENTS

| | | | |
|---|---|---|---|
| 1,438,462 | 12/1922 | Palmgren | 346—7 |
| 1,722,069 | 7/1929 | Widney | 346—7 |
| 1,827,190 | 10/1931 | Carter | 346—7 |
| 3,140,910 | 7/1964 | Duke et al. | 346—7 |

RICHARD B. WILKINSON, *Primary Examiner.*

JOSEPH W. HARTARY, *Assistant Examiner.*

U.S. Cl. X.R.

73—489

U.S. DEPARTMENT OF COMMERCE
PATENT OFFICE
Washington, D.C. 20231

UNITED STATES PATENT OFFICE
CERTIFICATE OF CORRECTION

Patent No. 3,438,048          April 8, 1

Burke A. Tracey et al.

It is certified that error appears in the above identified patent and that said Letters Patent are hereby corrected as shown below:

Column 1, line 34, "liimts" should read -- limits --. Column 3, line "follows" should read -- following --. Column 5, line 34, "thin" should read -- this --. Column 6, line 5, "60" should read -- 66 --; line 65, "indications" should read -- indicators --. Column 7, line 50, "delay" should read -- relay --. Column 9, line 15, "memer" should read -- membe1

Signed and sealed this 14th day of April 1970.

(SEAL)
Attest:

Edward M. Fletcher, Jr.

Attesting Officer

WILLIAM E. SCHUYLER,
Commissioner of Pate